(12) United States Patent
McArdle et al.

(10) Patent No.: US 12,157,784 B2
(45) Date of Patent: *Dec. 3, 2024

(54) TWO-PART CURABLE COMPOSITION

(71) Applicant: BOSTIK SA, Colombes (FR)

(72) Inventors: Ciaran McArdle, Barcelona (ES); Arnau Pejoan Jimenez, Barcelona (ES); Maria Campanya Illovet, Barcelona (ES); Veronica De la Fuente Molina, Barcelona (ES); Silvia Alujas Burgos, Barcelona (ES)

(73) Assignee: BOSTIK SA, Colombes (FR)

( * ) Notice: Subject to any disclaimer, the term of this patent is extended or adjusted under 35 U.S.C. 154(b) by 262 days.

This patent is subject to a terminal disclaimer.

(21) Appl. No.: 17/439,435

(22) PCT Filed: Mar. 18, 2020

(86) PCT No.: PCT/EP2020/057384
§ 371 (c)(1),
(2) Date: Sep. 15, 2021

(87) PCT Pub. No.: WO2020/187963
PCT Pub. Date: Sep. 24, 2020

(65) Prior Publication Data
US 2022/0185929 A1  Jun. 16, 2022

(30) Foreign Application Priority Data
Mar. 19, 2019 (EP) .................... 19305334

(51) Int. Cl.
*C08F 222/32* (2006.01)
*C09J 4/00* (2006.01)

(52) U.S. Cl.
CPC ............. *C08F 222/322* (2020.02); *C09J 4/00* (2013.01)

(58) Field of Classification Search
CPC ...... C08F 222/322; C08F 222/327; C09J 4/00
See application file for complete search history.

(56) References Cited

U.S. PATENT DOCUMENTS

| | | | |
|---|---|---|---|
| 2,467,927 A | 4/1949 | Ardis et al. | |
| 3,260,637 A | 7/1966 | Von Bramer | |
| 3,836,377 A | 9/1974 | Delahunty | |
| 4,042,442 A | 8/1977 | Dombroski et al. | |
| 4,460,758 A | 7/1984 | Peiffer et al. | |
| 5,066,743 A | 11/1991 | Okamoto et al. | |
| 5,110,392 A | 5/1992 | Ito et al. | |
| 5,350,875 A | 9/1994 | Kumar et al. | |
| 5,430,177 A | 7/1995 | Sabahi et al. | |
| 6,001,213 A | 12/1999 | Liu | |
| 6,706,414 B1 | 3/2004 | Dammann et al. | |
| 2003/0191248 A1 | 10/2003 | Ryan et al. | |
| 2005/0000646 A1 | 1/2005 | Ryan et al. | |
| 2009/0048378 A1 | 2/2009 | Kawazu et al. | |
| 2017/0260422 A1 | 9/2017 | Arnau et al. | |
| 2017/0335151 A1 | 11/2017 | Ward et al. | |
| 2020/0152350 A1 | 5/2020 | Yamaga et al. | |

FOREIGN PATENT DOCUMENTS

| | | | |
|---|---|---|---|
| EP | 0659859 A1 | 6/1995 | |
| EP | 0970137 A1 | 1/2000 | |
| EP | 2807224 B1 * | 5/2020 | ............... C09J 4/00 |
| JP | H06145606 A | 5/1994 | |
| JP | 2007169397 A | 7/2007 | |
| JP | 2015509126 A | 3/2015 | |
| WO | 9841561 A1 | 9/1998 | |
| WO | 2005012394 A2 | 2/2005 | |
| WO | 2013111036 A1 | 8/2013 | |
| WO | 2015059644 A1 | 4/2015 | |
| WO | 2017202698 A1 | 11/2017 | |
| WO | 2018216737 A1 | 4/2020 | |

OTHER PUBLICATIONS

ISA/EP; International Search Report and Written Opinion for International Patent Application No. PCT/EP2020/057384 dated Apr. 20, 2020, 13 pages.

* cited by examiner

Primary Examiner — Catherine S Branch
(74) Attorney, Agent, or Firm — NK Patent Law

(57) ABSTRACT

The present invention concerns a two-part curable composition comprising: • a first part (component A) comprising at least 51% by weight based on the total weight of the first part, of one or more cyanoacrylate monomer(s), provided that at least one of the cyanoacrylate monomer(s) is a cyanoacrylate monomer comprising a group —X—O—$R^b$ wherein X is a linear or branched alkylene radical optionally interrupted with one or several oxygen atom(s), and $R^b$ is an alkyl group; • a second part (component B) comprising: at least one Michael acceptor M selected from the group consisting of (meth)acrylic monomers, (meth)acrylic functionalized oligomers, (meth)acrylic functionalized resins, and mixtures thereof, provided that at least one of the Michael acceptor(s) M comprises at least one group of formula —O(CHR$^a$—CH$_2$O)$_n$— where n ranges from 1 to 10 (Michael acceptor M1), and $R^a$ represents CH$_3$ or H; and a nucleophilic initiator.

19 Claims, No Drawings

TWO-PART CURABLE COMPOSITION

CROSS-REFERENCE TO RELATED APPLICATIONS

This application is a U.S. National Stage application of International Patent Application No. PCT/EP2020/057384, filed on Mar. 18, 2020, which claims the benefit of European Patent Application No. 19305334.5, filed on Mar. 19, 2019.

FIELD OF THE INVENTION

The present invention relates to the field of two-part curable composition based on cyanoacrylates.

The present invention also related to the use of the two-part curable composition.

BACKGROUND ART

Adhesive compositions based on cyanoacrylate (CA) esters are well-known, e.g. as instant adhesives or so-called 'superglues'. They are popular in many areas of application and are used by consumers, professional craft workers and industrial assemblers. They are typically solvent free, 100% reactive materials, noted for their ability to form strong adhesive bonds on many different substrates rapidly and without the need of energetic stimuli, such as electromagnetic radiation or heat, to invoke adhesive cure. These attributes are very appealing from the viewpoint of sustainability and end user convenience.

The ability of conventional single-component (1K) CAs to cure, or polymerise, in the process of assembly of most substrate types partly relates to the fact that initiation of the polymerisation process occurs from nucleophilic or ionic species found, under normal circumstances, on most surfaces, e.g., absorbed water, salts, traces of basic materials, etc. When parts to be assembled from substrates such as metals, alloys, ceramics, rubbers, papers, living tissue, leathers and plastics, etc., are placed in contact with a thin layer of liquid cyanoacrylate adhesive in between, a very strong joint results when the adhesive cures solid.

Even though the breadth of substrate types that CA can bond rapidly at room temperature is far superior to any other adhesive class, certain substrates pose challenges, for example the so-called 'low surface energy' substrates, such as polyolefins and 'non-stick' fluorinated polymers. Technical solutions addressed to solve this limitation have been disclosed in the state of the art, such as, for example, U.S. Pat. Nos. 3,260,637, 3,836,377, 4,460,758, 5,818,325, 5,110,392, 5,066,743, 6,001,213, US-A-2003/0191248, or US-A-2005/0000646, wherein the use of activators prior to the subsequent application of the CA composition was proposed.

However, one impediment associated with 1K adhesives relates to the lack of so-called 'cure through volume' (CTV). This limited cure throughout the bulk adhesive in thicker bondlines arises because the most efficient cure occurs closest to the source of initiating species, which are found on the surfaces.

An alternative and more efficient approach to achieve CTV between substrates being assembled when using CA adhesives is one that avoids the dependence on the substrate surfaces only as a source of efficacious initiator. Such an approach instead relies on direct mixing of specific activators contained in a liquid or gel-like carrier into the bulk reactive CA compositions, wherein the mixture of these two separate compositions is then applied to the substrate(s). This approach can offer superior distribution of the activator into the body of the adhesive relative to activating solely from each substrate interface, when the activator is at an appropriate concentration in a compatible carrier. In this context, the admixing components into the bulk adhesive is referred to as a 'two-part', 'two-component', or '2K' approach and such approaches involving CA compositions are well known in the prior art.

When describing 2K approaches, it is common to refer to separate components or parts of the adhesive and/or its package, for example as 'Part A', and 'Part B'. Thus, if Part A contains a CA composition in one compartment or reservoir, then Part B may contain compositions selected to activate, react and/or modify physical properties (plasticize, colour, toughen, etc.) of the adhesive that results from mixing the two parts by any means.

Whereas there is clear advantage of uniformly mixing an activating component directly into a CA composition to achieve simultaneous initiation throughout the bulk of the adhesive, new challenges emerge with this approach.

Firstly, cyanoacrylate compositions are extremely reactive and only minor concentrations, typically ranging from tens to a few thousand parts per million, of activator species may be required to initiate polymerisation. Such tiny amounts must be contained in a suitable carrier to enable uniform mixing when mixed into the bulk cyanoacrylate composition.

Secondly, by purposeful activation, the time available to the end user to dispense and assemble once having 'triggered' (activated) polymerisation is obviously limited.

The two-part approach typically offers several benefits over single part adhesives, but the approach also has some disadvantages. In particular the very act of admixing an activator can create inconvenience since this starts the cure reaction and therefore limits the time the end user has to perform bonding tasks. Prior art approaches go some way to achieve balance in working times but often at the expense of other performance parameters.

As indicated for structural two-part acrylic adhesives in EP 0 659 859, a highly desirable goal would be the realisation of a reactive bulk composition which could be already activated or initiated yet achieve long working and on-part open times as well as relatively fast fixture when an end user is ready to assemble and bond parts. In the case of CA this is even more elusive because they possess the highest rates of polymerization of known commercial monomers once initiated. In fact, attributes such as long on-part open time combined with a subsequent fast fixturing time of parts are diametrically opposed most especially for CA. Notwithstanding the desire to achieve such benefits, there is a need for the same adhesive to also bond parts derived from multiple substrate types with high strength and exhibit high CTV, thermal, solvent and humidity resistance, again which are properties that are not straightforward to design into a cyanoacrylate adhesive without compromises.

Thus, there is still the need to provide new adhesive two-part compositions fast fixturing combined with extended periods of time remaining usable once activated, and at least one of the following properties: curing through depth, thermal resistance and chemical resistance.

There is more particularly a need to provide new two-part composition exhibiting thermal resistance.

DETAILED DESCRIPTION OF THE INVENTION

The present invention concerns a two-part curable composition comprising:

a first part (component A) comprising at least 51% by weight based on the total weight of the first part, of one or more cyanoacrylate monomer(s), provided that at least one of the cyanoacrylate monomer(s) is a cyanoacrylate monomer comprising a group —X—O—$R^b$ wherein X is a linear or branched alkylene radical optionally interrupted with one or several oxygen atom(s), and $R^b$ is an alkyl group;

a second part (component B) comprising:
  at least one Michael acceptor M selected from the group consisting of (meth)acrylic monomers, (meth)acrylic functionalized oligomers, (meth)acrylic functionalized resins, and mixtures thereof, provided that at least one of the Michael acceptor(s) M comprises at least one group of formula —O(CHR$^a$—CH$_2$O)$_n$— where n ranges from 1 to 10 (Michael acceptor M1), more preferably from 1 to 4, yet more preferably n being 1 or 2, and $R^a$ represents CH$_3$ or H; and
  a nucleophilic initiator;

the second part being characterized in that:
  the total content of Michael acceptor(s) M1 is of at least 20% by weight based on the total weight of the second part, and
  it does not comprise cyanoacrylate monomer.

The ranges disclosed in this description include both the lower and the upper limit thereof. For example, the expressions "ranging from x to y" or "between x and y" comprises the limits x and y.

The term 'working lifetime' or 'Working Time ("WT")' used throughout the instant description refers to the period between first admixing of an activator into the cyanoacrylate composition and subsequent application of the activated composition to parts, that is the time the activated product resides or remains in the static mixing element (that is used to unite adhesive components and as a dispensing nozzle) itself, i.e., between dispensing operations. Once activator is admixed the curing process begins and continues as the adhesive is dispensed from the static mixing element.

The term 'Open Time' ('OT') refers to the time wherein already activated and subsequently dispensed adhesive remains workable, that is, not substantially cured when applied as a drop, bead, or volume on one substrate, to the extent that it cannot form an effective adhesive bond when used to unite a second substrate. Open time thus describes the period wherein the adhesive remains activated but substantially uncured and ready to usefully bond parts. An adhesive with a long OT refers to one that does not set-up prematurely before parts are assembled even after residing for a relatively long time on single parts.

The term 'Fixture time' ("FT") used in the instant description is a measure of bonding speed defined as the time taken for a bonded assembly, using a minimum quantity of adhesive (a 'small' drop) on two matching substrates to have the ability to suspend a 3 Kg weight for longer than 10 s, when the weight is hung on one end of the bonded assembly in a vertical orientation.

Component A
Cyanoacrylate Monomer(s)

In a preferred embodiment, cyanoacrylate monomer has the general formula (I):

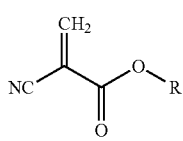

(I)

wherein R is selected from the group consisting of $C_1$-$C_{18}$ linear or branched alkyl, $C_3$-$C_{20}$ alkoxyalkyl, trimethylsilylated $C_1$-$C_3$ alkyl, furfuryl, allyl, cyclohexyl, and a group having the following formula: —$R^i$—O—C(O)—C($R^j$)=CH$_2$ with $R^i$ being an organic moiety (preferably alkylene group), and $R^i$ being H or CH$_3$. In formula (I), R represents preferably a $C_1$-$C_{18}$ linear or branched alkyl or a $C_3$-$C_{20}$ alkoxyalkyl.

In one embodiment, cyanoacrylate monomers having the formula (I) above are those wherein R has the general formula (II):

(II)

wherein $R_1$=CH$_3$ or H, $R_2$=$C_1$-$C_4$ linear or branched alkyl, and m ranges from 1 to 3.

The cyanoacrylate monomer(s) may be chosen from the group consisting of 2-methoxyethyl cyanoacrylate, 2-ethoxyethyl cyanoacrylate, 2-(1-methoxy)propyl cyanoacrylate, n-propyl cyanoacrylate, ethyl-2-cyanoacrylate, iso-propyl cyanoacrylate, n-butyl cyanoacrylate, sec-butyl cyanoacrylate, iso-butyl cyanoacrylate, tert-butyl cyanoacrylate, n-pentyl cyanoacrylate, 1-methylbutyl cyanoacrylate, 1-ethylpropyl cyanoacrylate, neopentyl cyanoacrylate, n-hexyl cyanoacrylate, 1-methylpentyl cyanoacrylate, n-heptyl cyanoacrylate, n-octyl cyanoacrylate, n-nonyl cyanoacrylate, n-decyl cyanoacrylate, n-undecyl cyanoacrylate, n-dodecyl cyanoacrylate, cyclohexyl cyanoacrylate, and mixtures thereof.

Combinations of one or more such cyanoacrylates may be used.

Preferably, the cyanoacrylate monomer is chosen from the group consisting of ethyl-2-cyanoacrylate, 2-methoxyethyl cyanoacrylate, and mixtures thereof.

Such monomers of formula (I) can be prepared by methods known by the skilled in the art as, for example, as in the method described in the U.S. Pat. No. 2,467,927.

Some of them, such as ethyl-2-cyanoacrylate (ECA) and 2-methoxyethyl cyanoacrylate (MECA) are commercially available.

In the first part of the composition of the invention, the total content of cyanoacrylate monomer(s) may be higher than 60% by weight, preferably higher or equal to 70% by weight, and more particularly higher or equal to 85% by weight based on the total weight of the first part.

In one embodiment, in the first part of the composition of the invention, the total content of cyanoacrylate monomer(s) ranges from 60% to 99% by weight, preferably from 70% to 98% by weight, and more preferably from 85% to 95% by weight based on the total weight of the first part of the composition.

Preferably, the first part of the composition comprises at least 20% by weight of at least one cyanoacrylate monomer comprising a group —X—O—$R^b$, based on the total weight of the first part of the composition, more preferably at least 30% by weight, and even more preferably at least 50% by weight.

In the first part of the composition, at least one cyanoacrylate monomer is a cyanoacrylate monomer comprising a group —X—O—$R^b$ wherein X is a linear or branched alkylene radical optionally interrupted with one or several oxygen atom(s), and $R^b$ is an alkyl group. Preferably, X is a linear alkylene comprising from 2 to 5 carbon atoms, more preferably one or two carbon atoms, and $R^b$ is an alkyl group comprising from 1 to 6 carbon atoms, preferably one or two carbon atoms.

The cyanoacrylate monomer comprising a group —X—O—$R^b$ may be chosen from the group consisting of 2-methoxyethyl cyanoacrylate, 2-ethoxyethyl cyanoacrylate, 2-(1-methoxy)propyl cyanoacrylate, 2-(2'-methoxy)-ethoxyethyl-2''-cyanoacrylate, 2-(2'-ethoxy)-ethoxyethyl-2''-cyanoacrylate, 2-(2'-propyloxy)-ethoxyethyl-2''-cyanoacrylate, 2-(2'-butoxy)-ethoxyethyl-2''-cyanoacrylate, 2-(2'-pentyloxy)-ethoxyethyl-2''-cyanoacrylate, 2-(2'-hexyloxy)-ethoxyethyl-2''-cyanoacrylate, 2-(2'-methoxy)-propyloxypropyl-2''-cyanoacrylate, 2-(2'-ethoxy)-propyloxypropyl-2''-cyanoacrylate, 2-(2'-propyloxy)-propyloxypropyl-2''-cyanoacrylate, 2-(2'-butyloxy)-propyloxypropyl-2''-cyanoacrylate, 2-(2'-pentyloxy)-propyloxypropyl-2''-cyanoacrylate, 2-(2'-hexyloxy)-propyloxypropyl-2''-cyanoacrylate, 2-(2'-methoxy)-butyloxybutyl-2''-cyanoacrylate, 2-(2'-ethoxy)-butyloxybutyl-2''-cyanoacrylate, 2-(2'-butyloxy)-butyloxybutyl-2''-cyanoacrylate, 2-(3'-methoxy)-propyloxyethyl-2''-cyanoacrylate, 2-(3'-methoxy)-butyloxyethyl-2''-cyanoacrylate, 2-(3'-methoxy)-propyloxypropyl-2''-cyanoacrylate, 2-(3'-methoxy)-butyloxypropyl-2''-cyanoacrylate, 2-(2'-methoxy)-ethoxypropyl-2''-cyanoacrylate, 2-(2'-methoxy)-ethoxybutyl-2''-cyanoacrylate, and mixtures thereof. Preferably, the cyanoacrylate monomer comprising a group —X—O—$R^b$ is 2-methoxyethyl cyanoacrylate.

Additives

The first part of the composition may further contain at least one additive for example chosen from the group consisting of: a thixotropic agent, a thickening agent, a toughening agent, an accelerating agent, a per-compound, an adhesion promoter, a pigment, a colorant, a stabilizing agent, an antioxidant, a plasticizer, and mixtures thereof.

A suitable stabilizing agent may be selected from the group consisting of radical stabilizing agents, acid stabilizing agents, and mixtures thereof.

Radical stabilizing agents are typically radical polymerization inhibitors, and are preferably selected from the group consisting of 4-methoxyphenol, hydroquinone, hydroquinone monomethyl ether, hydroxytoluene butyl ether, hydroxyanisole butyl ether, 4,4'-methylenebis (2,6-di-tert-butylphenol), and mixtures thereof.

The total content of radical stabilizing agent(s), in the first part of the composition, may range from 0.001% to 0.2% by weight, preferably from 0.01% to 0.1%, and more preferably from 0.02% to 0.06% by weight based on the total weight of the first part.

The acid stabilizing agents are typically inhibitors of the anionic polymerization. The acid stabilizing agent may be selected from the group consisting of Bronsted acids, Lewis acids, and mixtures thereof. The acid stabilizing agent is preferably selected from the group consisting of methanesulfonic acid, p-toluenesulfonic acid, hydrofluoric acid, boron trifluoride, boron trifluoride etherate complex, fluoroboric acid, sulphur dioxide, and mixtures thereof.

In a preferred embodiment, the first part of the composition comprises methanesulphonic acid, sulphur dioxide, boron trifluoride etherate complex, hydroquinone and hydroquinone monomethylether and 4,4'-methylenebis(2,6-di-tert-butylphenol).

In the first part of the composition, the total content of stabilizing agent(s) generally ranges from 0.0001% by weight to 1% by weight, preferably from 0.001% to 0.8%, and more preferably from 0.0015% to 0.7% by weight based on the total weight of the first part.

Typically, an adhesion promoter may be chosen from the group of aromatic carboxylic acid or anhydride, and preferably from the group consisting of trimellitic acid, trimellitic anhydride, pyromellitic acid, pyromellitic anhydride, dianhydride of 3,3',4,4'-benzophenonetetracarboxylic acid, itaconic acid, itaconic anhydride, 3-buten-1,2,3-tricarboxylic acid, and mixtures thereof.

The total content of adhesion promoter(s) in the first part of the composition may range from 0.02% to 0.1% by weight, more preferably from 0.03% to 0.08% by weight based on the total weight of the first part.

A suitable accelerating agent (or accelerator) may be selected from calixarenes, crown ethers (for example, 15 Crown 5, 18 Crown 6, Dibenzo 18 Crown 6, commercialized by Alfa Aesar), cyclodextrins, and mixtures thereof.

Typically, the total content of accelerator(s) in the first part of the composition may range from 0.01% to 0.8% by weight, preferably from 0.05% to 0.5%, and more preferably from 0.1% to 0.3% by weight based on the total weight of the first part.

A suitable thixotropic agent may be selected from the group consisting of hydrogenated castor oil optionally modified by reaction with an amine, polyamides, silica, and mixtures thereof.

Preferably, the thixotropic agent is silica, more preferably selected from the group consisting of fumed silica, hydrophobic fumed silica (for example Aerosil® R202 commercialized by Evonik), hydrophilic fumed silica and precipitated silica.

Typically, the total content of thixotropic agent(s) in the first part of the composition may range from 2% to 10% by weight, preferably from 3% to 8%, and more preferably from 4% to 7% by weight based on the total weight of the first part.

A suitable thickener or thickening agent for the first part of the composition can be selected from those that are compatible with the host monomers. Examples of such thickeners include poly(meth)acrylates, acylated cellulose polymers, for example cellulose acetate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycolterephthalate, copolymers of lactic acid and caprolactone, and mixtures thereof.

These thickening agents are well known to the skilled in the art and have been described in the prior art. Preferably, in the adhesive of the invention the thickener is selected from the group consisting of poly(meth)acrylates, polymethyl(meth)acrylate, polyvinylpyrrolidones, polyvinyl acetates, partially hydrolysed polyvinyl acetates, vinyl acetate copolymers, and acylated cellulose polymers. A suitable thickener for first part of the composition can be, for example, polymethylmethacrylate (for example Degacryl® M 449, Evonik), copolymers of vinyl acetate and vinyl alcohol (for example Levamelt® 900, Lanxess), copolymers of vinyl chloride and vinyl acetate (for example, Vinnol® H 40-60, Wacker), copolymers of ethylene, vinyl acetate, and esters or partial esters of maleic acid (for example, Vamac® G, DuPont), and mixtures thereof. Polycyanoacrylates themselves may be added to cyanoacrylate compositions to confer a degree of thickening.

Typically, the total content of thickener(s) in the first part of the composition may range from 2% to 10% by weight, preferably from 3% to 8%, and more preferably from 4% to 7% by weight based on the total weight of the first part of the composition.

Suitable tougheners or toughening agents for the first part of the composition are block copolymers (Polymethylmethacrylate-co-Polybutylacrylate-co-Polymethylmethacrylate for example); elastomeric rubbers; elastomeric polymers; liquid elastomers; polyesters; acrylic rubbers; butadiene/acrylonitrile rubber; Buna rubber; polyisobutylene; polyisoprene; natural rubber; synthetic rubber such as styrene/butadiene rubber (SBR); polyurethane polymers; ethylene-vinyl acetate polymers; fluorinated rubbers; isoprene-acrylonitrile polymers; chlorosulfonated polyethylenes; homopolymers of polyvinyl acetate; block copolymers; core-shell rubber particles, and mixtures thereof.

A per-compound is a compound that contains the group O—O in the structure, such as for example a perester, perborate, persulfate, peracetal, or peroxide.

Suitable per-compounds are, for example, tert-butyl perbenzoate (TBPB) or tert-butyl peroxide (TBP).

If present, the total content is preferably comprised between 1% and 20% by weight, preferably between 2% and 15% by weight, and more preferably between 5 and 12% by weight based on the total weight of the first part of the composition.

Preferably, the first part of the composition does not comprise per-compound, and more preferably does not comprise peroxide.

In a preferred embodiment, the first part of the composition comprises a thickener and a thixotropic agent, and preferably it further comprises an adhesion promoter, and at least one stabilizing agent.

Component B
Michael Acceptors M

The second part of the composition comprises at least one Michael acceptor M selected from the group consisting of (meth)acrylic monomers, (meth)acrylic functionalized oligomers, (meth)acrylic functionalized resins, and mixtures thereof.

Michael reactions are well known in the art and involve the addition of a Michael donor to a Michael acceptor. It refers to the addition reaction of a carbanion or nucleophile and an activated α,β-unsaturated carbonyl compound or group. Examples of such reactions are disclosed in U.S. Pat. Nos. 5,350,875, 5,430,177, 6,706,414, WO 2005/012394 and EP 0 970 137. A Michael donor is a compound with at least one Michael donor functional group, which is a functional group containing at least one Michael active hydrogen atom which is a hydrogen atom attached to a carbon atom that is located between two electron-withdrawing groups such as for example C=O, CN. Non-exhaustive list of examples of Michael donor functional groups include acetoacetate ester malonamides, cyanoacetates, chain ends of polycyanoacrylates.

The Michael acceptor M may be monofunctional or polyfunctional (such as di- or tri-functional).

The Michael acceptor M may comprise one (meth)acrylic function or several (meth)acrylic functions. Acrylates are typically superior Michael acceptors to methacrylates.

The (meth)acrylic monomers may be chosen from the group consisting of:
i) a compound of general formula (III)

$$CH_2=CR_3(CO_2R_4) \tag{III}$$

wherein $R_3$ represents methyl or H (preferably H), and $R_4$ is a hydrogen atom, a $C_1$-$C_8$ linear or branched alkyl, a $C_2$—C linear or branched alkoxyalkyl, a furfuryl or a isobornyl group;

ii) a compound selected from the group consisting of: butanediol di(meth)acrylate, hexanediol di(meth)acrylate, diethylene glycol di(meth)acrylate, triethyleneglycol di(meth)acrylate, polyethylene glycol di(meth)acrylate, trimethylolpropane tri(meth)acrylate (TMPTA), ethoxylated trimethylolpropane tri(meth)acrylate, neopentylglycol diacrylate, pentaerythritol tetraacrylate (PETA), pentaerythritol tetramethacrylate (PETMA), dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; and iii) mixtures thereof.

Examples of (meth)acrylic monomers are readily available from well-known suppliers such as, for example, Sartomer, Arkema, and BASF.

Polyfunctional (meth)acrylic esters may be of relatively low molecular weight such as the commercially available, triethylene oxide dimethacrylate, or butanediol dimethacrylate, or may be of higher molecular weight: (meth)acrylic functionalized oligomers and (meth)acrylic functionalized resins, for example (meth)acrylic ester terminated polymers, such as (meth)acrylic terminated urethane polymers or copolymers or so-called (meth)acrylic ester functionalised telechelic, dendrimeric or hyperbranched materials.

In a preferred embodiment, the second part of the composition comprises more than 30% by weight of Michael acceptor M, more preferably more or equal to 50% by weight, even more preferably higher or equal to 70% by weight, in particular higher or equal to 90% by weight based on the total weight of the second part.

In the second part of the composition, at least one of the Michael acceptor(s) M comprises at least one group of formula —O(CHR$^a$—CH$_2$O)$_n$— where n ranges from 1 to 10 (Michael acceptor M1) and R$^a$ represents CH$_3$ or H. Preferably, Michael acceptor M1 is such that n ranges from 1 to 4, yet more preferably n being 1 or 2.

The Michael acceptor M1 preferably comprise at least two (meth)acrylic functions.

The Michael acceptor M1 may be chosen from the group consisting of: ethoxylated bisphenol-A-di(meth)acrylate, ethoxylated trimethylolpropane tri(meth)acrylate, polyethylene glycol diacrylate, propoxylated neopentyl glycol diacrylate, tetraethylene glycol diacrylate, triethylene glycol diacrylate, tripropylene glycol diacrylate, and mixtures thereof. The number of ethylene oxide group may range from 1 to 5 in those compounds.

In a preferred embodiment, the Michael acceptor M1 is chosen from the group consisting of: ethoxylated bisphenol-A-di(meth)acrylate, ethoxylated trimethylolpropane tri(meth)acrylate, propoxylated neopentyl glycol diacrylate, tetraethylene glycol diacrylate, triethylene glycol diacrylate, tripropylene glycol diacrylate, and mixtures thereof. The number of ethylene oxide group may range from 1 to 5 in those compounds.

More preferably, the Michael acceptor M1 is chosen from the group consisting of ethoxylated bisphenol-A-di(meth)acrylate, ethoxylated trimethylolpropane tri(meth)acrylate, and mixtures thereof.

The molecular mass by weight (Mw) of the Michael acceptor M1 may range from 300 to 1000 g/mol, preferably from 400 to 800 g/mol.

The total content of Michael acceptor(s) M1 is of at least 20% by weight, preferably at least 30% by weight, more preferably at least 50% by weight, and even more preferably at least 60% by weight based on the total weight of the second part of the composition.

In a preferred embodiment, the Michael acceptors M of the second part of the composition are Michael acceptors M1.

Nucleophilic Initiator of the Polymerization

A nucleophilic initiator is an electron rich initiator which may be ionic or non-ionic.

The second part does not comprise cyanoacrylate monomer.

Preferred nucleophilic initiator may be selected from the group consisting of:
- organic bases (such as for example caffeine, theobromine, 5-chloro-2-methylbenzothiazole, tetrahydroquinolines);
- salts with a hard anion (such as for example choline chloride, benzalkonium chloride);
- $Ca^{2+}$, $Zn^{2+}$ or $Mg^{2+}$ salts of (meth)acrylic acid; and mixtures thereof.

The second part of the composition preferably comprises organic base, and even more preferably caffeine, as nucleophilic initiator.

The second part may comprises nucleophilic initiator in a concentration ranging from 0.05% to 1% by weight, and more preferably from 0.2% to 0.5% by weight based on the total weight of the second part of the composition.

Additives

The second part of the composition may further contain at least one additive for example chosen from the group consisting of: a thixotropic agent, a thickening agent, a toughening agent, an accelerating agent, a per-compound, an adhesion promoter, a pigment, a colorant, a stabilizing agent, an antioxidant, a plasticizer, and mixtures thereof.

A suitable stabilizing agent may be selected from the group consisting of radical stabilizing agents, acid stabilizing agents, and mixtures thereof.

Radical stabilizing agents are typically radical polymerization inhibitors, and are preferably selected from the group consisting of 4-methoxyphenol, hydroquinone, hydroquinone monomethyl ether, hydroxytoluene butyl ether, hydroxyanisole butyl ether, 4,4'-methylenbis (2,6-di-tert-butylphenol), and mixtures thereof.

The total content of radical stabilizing agent(s), in the second part of the composition, may range from 0% to 0.2% by weight, preferably from 0.01% to 0.1%, and more preferably from 0.02% to 0.06% by weight based on the total weight of the second part.

The acid stabilizing agents are typically inhibitors of the anionic polymerization. The acid stabilizing agent may be selected from the group consisting of Bronsted acids, Lewis acids, and mixtures thereof. The acid stabilizing agent is preferably selected from the group consisting of methanesulfonic acid, p-toluenesulfonic acid, hydrofluoric acid, boron trifluoride, boron trifluoride etherate complex, fluoroboric acid, sulphur dioxide, and mixtures thereof.

In the second part of the composition, the total content of stabilizing agent(s) may generally range from 0% by weight to 1% by weight, preferably from 0.001% to 0.8%, and more preferably from 0.0015% to 0.7% by weight based on the total weight of the second part.

Typically, an adhesion promoter may be chosen from the group of aromatic carboxylic acid or anhydride, and preferably from the group consisting of trimellitic acid, trimellitic anhydride, pyromellitic acid, pyromellitic anhydride, dianhydride of 3,3',4,4'-benzophenonetetracarboxylic acid, itaconic acid, itaconic anhydride, 3-buten-1,2,3-tricarboxylic acid, and mixtures thereof.

The total content of adhesion promoter(s) in the second part of the composition may range from 0% to 0.1% by weight, more preferably from 0.03% to 0.08% by weight based on the total weight of the second part.

A suitable accelerating agent (or accelerator) may be selected from calixarenes, crown ethers (for example, 15 Crown 5, 18 Crown 6, Dibenzo 18 Crown 6, commercialized by Alfa Aesar), cyclodextrins, and mixtures thereof.

Typically, the content of the accelerator in the second part of the composition may range from 0% to 0.8% by weight, preferably from 0.01% to 0.5%, and more preferably from 0.1% to 0.3% by weight based on the total weight of the second part.

A suitable thixotropic agent may be selected from the group consisting of hydrogenated castor oil optionally modified by reaction with an amine, polyamides, silica, and mixtures thereof.

Preferably, the thixotropic agent is silica, more preferably selected from the group consisting of fumed silica, hydrophobic fumed silica (for example Aerosil® R202 commercialized by Evonik), hydrophilic fumed silica and precipitated silica.

Typically, the content of the thixotropic agent in the second part of the composition may range from 2% to 10% by weight, preferably from 3% to 8%, and more preferably from 4% to 7% by weight based on the total weight of the second part.

A suitable thickener or thickening agent for the second part of the composition can be selected from those which are compatible with the monomers that it contains. Among them can be mentioned poly(meth)acrylates, acylated cellulose polymers, for example cellulose acetate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycolterephthalate, copolymers of lactic acid and caprolactone, and mixtures thereof.

These thickening agents are well known to the skilled in the art and have been described in the prior art. Preferably, in the composition of the invention the thickener is selected from the group consisting of poly(meth)acrylates, polyvinylpyrrolidones, polyvinyl acetates, partially hydrolysed polyvinyl acetates, vinyl acetate copolymers, and acylated cellulose polymers. A suitable thickener for first part of the composition can be, for example, polymethylmethacrylate (for example Degacryl® M 449, Evonik), copolymers of vinyl acetate and vinyl alcohol (for example Levamelt® 900, Lanxess), copolymers of vinyl chloride and vinyl acetate (for example, Vinnol® H 40-60, Wacker), copolymers of ethylene, vinyl acetate, and esters or partial esters of maleic acid (for example, Vamac® G, DuPont), and mixtures thereof. Polycyanoacrylates themselves may be added to cyanoacrylate compositions to confer a degree of thickening. Furthermore viscous functionalised resins can also act as thickeners in place of any additional polymeric additives.

Typically, the content of thickener in the second part of the composition may range from 2% to 10% by weight, preferably from 3% to 8%, and more preferably from 4% to 7% by weight based on the total weight of the second part of the composition.

Suitable tougheners or toughening agents for the first part of the composition are block copolymers (Polymethylmethacrylate-co-Polybutylacrylate-co-Polymethylmethacrylate for example); elastomeric rubbers; elastomeric polymers; liquid elastomers; polyesters; acrylic rubbers; butadiene/acrylonitrile rubber; Buna rubber; polyisobutylene; polyisoprene; natural rubber; synthetic rubber such as styrene/butadiene rubber (SBR); polyurethane polymers; ethylene-vinyl acetate polymers; fluorinated rubbers; isoprene-acrylonitrile polymers; chlorosulfonated polyethylenes; homopolymers of polyvinyl acetate; block copolymers; core-shell rubber particles, and mixtures thereof.

A per-compound is a compound that contains the group O—O in the structure, such as for example a perester, perborate, persulfate, peracetal, or peroxide.

Suitable per-compounds are, for example, tert-butyl perbenzoate (TBPB) or tert-butyl peroxide (TBP).

If present, the total content of the per-compound is preferably comprised between 0.1% and 20% by weight, preferably between 0.2% and 15% by weight, and more preferably between 0.2 and 12% by weight based on the total weight of the second part of the composition.

Preferably, the second part of the composition does not comprise benzothiazole compounds (including substituted benzothiazole compounds).

Composition

The two-part composition may be dispensed from packages (such as two-part syringes) or from reservoir pots. The former are generally convenient for manual application and the volume ratio first part:second part may range from 1:1 to 10:1, more preferably 2:1, or 4:1. Two-part compositions may also be dispensed using automated equipment and mixing ratios may be continuously adjustable form 1:1 to 10:1.

In the two-part composition, the volume ratio first part:second part may range from 1:1 to 10:1, preferably from 2:1 to 5:1, and even more preferably 2:1, 3:1, 4:1 or 5:1.

A preferred two-part curable composition comprises:
a first part (component A) comprising:
  at least 70% by weight based on the total weight of the first part, of one or more cyanoacrylate monomer(s), provided that at least one of the cyanoacrylate monomer(s) is a cyanoacrylate monomer comprising a group —X—O—$R^b$ wherein X is a linear or branched alkylene radical optionally interrupted with one or several oxygen atom(s), and $R^b$ is an alkyl group;
  from 0.001% to 0.2% of stabilizing agent(s);
  from 2% to 8% by weight of thixotropic agent(s);
  from 2% to 8% by weight of thickening agent(s);
a second part (component B) comprising:
  at least 40% by weight of at least one Michael acceptor M selected from the group consisting of (meth)acrylic monomers, (meth)acrylic functionalized oligomers, (meth)acrylic functionalized resins, and mixtures thereof, provided that at least one of the Michael acceptor(s) M comprises at least one group of formula —O(CHR$^a$—CH$_2$O)$_n$— where n ranges from 1 to 10 (Michael acceptor M1), more preferably from 1 to 4, yet more preferably n being 1 or 2, and $R^a$ represents CH$_3$ or H; and
  from 0.01% to 1% by weight of nucleophilic initiator(s) based on the total weight of the second part;
  from 0% to 5% of thixotropic agent(s);
the second part being characterized in that the total content of Michael acceptor(s) M1 is of at least 40% by weight based on the total weight of the second part.

Syringe or Cartridge or Dispense Heads

The present invention also concerns a syringe or a cartridge or dispense heads comprising the two-part curable composition defined above.

Preferably, the syringe (or the cartridge) is a syringe (respectively a cartridge) with two chambers each of different volume, one for the first part of the composition and another one for the second part of the composition as defined above.

The first part of the composition is preferably placed in the chamber of larger volume.

The preparation of the adhesive is preferably made by the mixture of the two parts of the composition by hand pressure, or assisted by a gun, on the plungers of the syringe or the cartridge, which forces the content of the chambers to enter into the static mixer and, thus, at its outlet the adhesive of the invention is obtained. In the adhesive, the two components are advantageously intimately mixed.

For automated dispense preparation of the adhesive is preferably made by the mixture of the two parts of the composition by forcing them together into a valve and mixing element that constitutes a dispense head, so specific quantities of mixture of the desired composition can be dispensed onto parts.

Use of the Composition

The present invention also concerns the use of the two-part curable composition as defined above for bonding substrates.

The present invention also concerns a method for bonding substrates comprising the steps of:
  applying a two-part curable composition as defined above to at least one of the substrates,
  mating together the substrates for a time sufficient to permit an adhesive bond to form between the mated substrates;
  optionally heating the mated (and optionally clamped) substrates, in particular to a temperature higher than 100° C., more preferably higher than 120° C.

The heating step may be carried out for a time sufficient to reach the desired properties, preferably for a time ranging from 1 minute to 5 days.

The two-part adhesive composition of the invention advantageously exhibits at least one of the following properties:
  Fast fixturing: preferably lower than 1 min, more preferably lower than 35 s;
  Long on part open time: preferably greater than 30 minutes at room temperature (25° C.);
  High bond strengths;
  A high degree of CTV;
  High resistance to thermal ageing;
  High resistance to submersion in hot water;
  Good energy absorption;
  Good resistance to organic solvents (preferably between 50 and 100% of insolubility at room temperature in acetone for 24 h).

The present invention also concerns the use of at least one cyanoacrylate monomer comprising a group —X—O—$R^b$ wherein X is a linear or branched alkylene radical optionally interrupted with one or several oxygen atom(s), and $R^b$ is an alkyl group, in the first part of a two-part curable composition for improving thermal resistance of the two-part curable composition, said two-part curable composition comprising:
  a first part comprising cyanoacrylate monomer(s), preferably at least 51% by weight based on the total weight of the first part;

a second part comprising:
- at least one Michael acceptor M selected from the group consisting of (meth)acrylic monomers, (meth)acrylic functionalized oligomers, (meth)acrylic functionalized resins, and mixtures thereof, provided that at least one of the Michael acceptor(s) M comprises at least one group of formula —O(CHR$^a$—CH$_2$O)$_n$— where n ranges from 1 to 10 (Michael acceptor M1), more preferably from 1 to 4, yet more preferably n being 1 or 2, and R$^a$ represents CH$_3$ or H; and
- a nucleophilic initiator;

the second part being characterized in that the total content of Michael acceptor(s) M1 is of at least 20% by weight based on the total weight of the second part, and that it does not comprise cyanoacrylate monomer.

All the features mentioned for the two-part composition above (such as ingredients, weight percent, . . . ) applies for the above-mentioned use.

EXAMPLES

All the following ingredients were used:
Ethyl cyanoacrylate (ECA): Cartell Chemical Co Ltd
Methoxyethyl cyanoacrylate (MECA): Cartell Chemical Co. Ltd
SO$_2$: Carburos Metalicos SA
Sartomer SR 454: Ethoxylated trimethylolpropane triacrylate commercialized by Arkema
Sartomer SR349: Ethoxylated bisphenol A diacrylate commercialized by Arkema
Degacryl 449: Polymethylmethacrylate commercialized by Evonik
Aerosil R202: Hydrophobic fumed silica commercialized by Evonik
All of the following were obtained from Sigma Aldrich Merck:
Methane sulphonic acid, BF$_3$·etherate, Hydroquinone, Hydroquinone monomethylether, 4,4'-methylenebis(2,6-di-tert-butylphenol), Itaconic acid, Caffeine, tert-butyl perbenzoate The Following Methods were Used to Assess the Performance of the Compositions:

Tensile shear test data reflect bond strength measured in Mega Pascals (MPa) after assembling overlapping lapshear parts with a contact area of 25 mm$^2$; measured according to ASTM D1002 bonded lapshears rested for 24 h after assembly before testing. Testing for resistance is also measured on assembled lapshear specimens after exposing to dry heat of 150° C. for 3 days, and also for assembled samples exposed to submersion in hot water (at 60° C.) for 3 days.

Gap bonding (GB) were measured by the tensile shear strength of bonded mild steel substrates (MS) lapshears when the gap between the two parts is set at 2 mm thickness by a small spacing wire of 2 mm diameter bent in a horseshoe shape. Strengths were measured after 24 hr resting after assembly.

The parameter Energy represents comparative measure of toughness or resistance to bond breaking measured as the area under the stress-strain curve during the destructive mechanical testing of gap bonded MS lapshears.

Example 1: Two-Part Adhesive Composition

The first and second part of the composition of example 1 indicated in Table 1 were prepared:

TABLE 1

| Composition | Component | % (w/w) or ppm |
|---|---|---|
| First part | Ethyl cyanoacrylate (ECA) | 53.6 |
| | Methoxyethyl cyanoacrylate (MECA) | 35.7 |
| | Methane sulphonic acid | 7 ppm |
| | SO$_2$ | 2 ppm |
| | BF$_3$·etherate | 2 ppm |
| | Hydroquinone | 0.04 |
| | hydroquinone monomethylether | 0.22 |
| | 4,4'-methylenbis(2,6-di-tert-butylphenol) | 0.4 |
| | Polymethylmethacrylate | 5 |
| | Hydrophobic fumed silica | 5 |
| | Itaconic acid | 0.0389 |
| Second part | Ethoxylated trimethylolpropane triacrylate | 70.7 |
| | Ethoxylated bisphenol A diacrylate | 23.6 |
| | Caffeine | 0.4 |
| | tert-butyl perbenzoate | 0.25 |
| | Hydrophobic fumed silica | 5.05 |

The first part of the composition comprises more than 89% by weight of cyanoacrylate monomers. The first part comprises a mixture of two cyanoacrylate monomers approximately 40% of which were MECA monomer.

The first and the second part of Table 1 were mixed in a 4:1 ratio in volume.

The two parts were loaded into a 4:1 syringe fitted with a 4:1 static mixer. The first part was the part of largest volume (80% of total).

When the parts mixed, cyanoacrylate cure was initiated by the organic base caffeine that crosses over from the second part on mixing.

The performance of this adhesive was determined as average of 4 samples. It is illustrated in Table 2 below:

TABLE 2

| Composition of Example 1 | |
|---|---|
| Parameter | Result |
| Weight ratio ECA:MECA | 60:40 |
| OT (open time) | 30 min |
| FT (fixture time) on MS | 30 s |
| % insoluble in acetone 24 h Room Temperature | 0 |
| Tensile shear | |
| MS | 19 MPa |
| Al | 19 MPa |
| Gap MS 2 mm | 12 MPa |
| Energy | 4 J |
| Tensile shear after thermal ageing | |
| MS 3 days/150° C. | 11 MPa |
| MS 3 days/60° C. (Submersion in water) | 11 MPa |

(MS = mild steel substrate, Al = aluminium substrate)

The open time and the fixture time are as defined in the description.

The composition of example 1 when cured advantageously exhibits a long open time of 30 min, and a fast fixturing time (30 s).

The cured composition has high strength on metals and displayed high CTV, and has also good energy absorbance.

Besides, the results show that the cured composition advantageously exhibits high strength after thermal ageing and also after submersion in hot water. After thermal treatment the cured adhesive is insoluble in acetone.

Examples 2 to 4: Two-Part Adhesive Compositions

Composition of example 2 is a comparative composition corresponding to the composition of example 1, wherein the first part comprises only ECA monomer instead of the mixture ECA/MECA as cyanoacrylate component. There is thus no cyanoacrylate monomer comprising a group —X—O—$R^b$ wherein X is a linear or branched alkylene radical optionally interrupted with one or several oxygen atom(s), and $R^b$ is an alkyl group in the composition of example 2.

Composition of example 3 corresponds to the composition of example 1, wherein the first part comprises only MECA monomer instead of the mixture ECA/MECA as cyanoacrylate component.

Composition of example 3 corresponds to the composition of example 1, wherein the second part does not comprise tert-butyl perbenzoate and the proportion of the ethoxylated bisphenol A diacrylate was readjusted.

Thermal resistance only was assessed after ageing 3 days at 150° C., according to example 1. In Table 4 below are shown the experimental results from these compositions:

TABLE 4

| Example | Weight ratio ECA:MECA | MS 3 days at 150° C. (MPa) |
|---|---|---|
| 2 (comparative) | 100:0 | 3 |
| 3 | 0:100 | 7 |
| 4 | 60:40 (without tert-butyl perbenzoate) | 7 |

Table 4 demonstrated that compositions 3 and 4 advantageously exhibit higher thermal resistance after ageing (7 MPa) compared to the comparative composition of example 2 which does not comprise MECA monomer in first part (only 3 MPa).

The invention claimed is:

1. A two-part curable composition comprising:
   a first part (component A) comprising at least 51% by weight based on the total weight of the first part, of one or more cyanoacrylate monomer(s), provided that at least one of the cyanoacrylate monomer(s) is a cyanoacrylate monomer comprising a group —X—O—$R^b$ wherein X is a linear or branched alkylene radical optionally interrupted with one or several oxygen atom(s), and $R^b$ is an alkyl group; and
   a second part (component B) comprising:
      at least one Michael acceptor M selected from the group consisting of (meth)acrylic monomers, (meth)acrylic functionalized oligomers, (meth)acrylic functionalized resins, and mixtures thereof, provided that at least one of the Michael acceptor(s) M comprises at least one group of formula —O(CHR$^a$—CH$_2$O)$_n$— where n ranges from 1 to 10 (Michael acceptor M1); and
      a nucleophilic initiator;
   wherein in the second part:
      the total content of Michael acceptor(s) M1 is of at least 20% by weight based on the total weight of the second part; and
      it does not comprise cyanoacrylate monomer.

2. The two-part curable composition according to claim 1, wherein at least one of the one or more cyanoacrylate monomer(s) has the general formula (I):

wherein R is selected from the group consisting of $C_1$-$C_{18}$ linear or branched alkyl, $C_3$-$C_{20}$ alkoxyalkyl, trimethylsilylated $C_1$-$C_3$ alkyl, furfuryl, allyl, cyclohexyl, and a group having the following formula: —$R^i$—O—C(O)—C($R^j$)=CH$_2$ with $R^i$ being an organic moiety, and $R^j$ being H or CH$_3$.

3. The two-part curable composition according to claim 2, wherein at least one of the one or more cyanoacrylate monomer(s) has the formula (I) wherein R has the general formula (II):

wherein $R_1$=CH$_3$ or H, $R_2$=$C_1$-$C_4$ linear or branched alkyl, and m ranges from 1 to 3.

4. The two-part curable composition according to claim 1, wherein the total content of cyanoacrylate monomer(s) in the first part is higher than 60% by weight, based on the total weight of the first part.

5. The two-part curable composition according to claim 1, wherein the first part of the composition comprises at least 20% by weight of at least one cyanoacrylate monomer comprising a group —X—O—$R^b$ wherein X is a linear or branched alkylene radical optionally interrupted with one or several oxygen atom(s), and $R^b$ is an alkyl group, based on the total weight of the first part of the composition.

6. The two-part curable composition according to claim 1, wherein the cyanoacrylate monomer comprising a group —X—O—$R^b$ is characterized in that X is a linear alkylene comprising from 2 to 5 carbon atoms.

7. The two-part curable composition according to claim 1, wherein the cyanoacrylate monomer comprising a group —X—O—$R^b$ is chosen from the group consisting of 2-methoxyethyl cyanoacrylate, 2-ethoxyethyl cyanoacrylate, 2-(1-methoxy) propyl cyanoacrylate, 2-(2'-methoxy)-ethoxyethyl-2"-cyanoacrylate, 2-(2'-ethoxy)-ethoxyethyl-2"-cyanoacrylate, 2-(2'-propyloxy)-ethoxyethyl-2"-cyanoacrylate, 2-(2'-butoxy)-ethoxyethyl-2"-cyanoacrylate, 2-(2'-pentyloxy)-ethoxyethyl-2"-cyanoacrylate, 2-(2'-hexyloxy)-ethoxyethyl-2"-cyanoacrylate, 2-(2'-methoxy)-propyloxypropyl-2"-cyanoacrylate, 2-(2'-ethoxy)-propyloxypropyl-2"-cyanoacrylate, 2-(2'-propyloxy)-propyloxypropyl-2"-cyanoacrylate, 2-(2'-butyloxy)-propyloxypropyl-2"-cyanoacrylate, 2-(2'-pentyloxy)-propyloxypropyl-2"-cyanoacrylate, 2-(2'-hexyloxy)-propyloxypropyl-2"-cyanoacrylate, 2-(2'-methoxy)-butyloxybutyl-2"-cyanoacrylate, 2-(2'-ethoxy)-butyloxybutyl-2"-cyanoacrylate, 2-(2'-butyloxy)-butyloxybutyl-2"-cyanoacrylate, 2-(3'-methoxy)-propyloxyethyl-2"-cyanoacrylate, 2-(3'-methoxy)-butyloxyethyl-2"-cyanoacrylate, 2-(3'-methoxy)-propyloxypropyl-2"-cyanoacrylate, 2-(3'-methoxy)-butyloxypropyl-2"-cyanoacrylate, 2-(2'-methoxy)-ethoxypropyl-2"- cyanoacrylate, 2-(2'-methoxy)-ethoxybutyl-2"-cyanoacrylate, and mixtures thereof.

8. The two-part curable composition according to claim 1, wherein the first part of the composition contains at least one additive chosen from the group consisting of: a thixotropic agent, a thickening agent, a toughening agent, an accelerating agent, a per-compound, an adhesion promoter, a pigment, a colorant, a stabilizing agent, an antioxidant, a plasticizer, and mixtures thereof.

9. The two-part curable composition according to claim 1, wherein the (meth)acrylic monomer is chosen from the group consisting of:
   i. a compound of general formula (III):

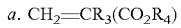
   $$a.\ CH_2=CR_3(CO_2R_4),\qquad(III)$$

wherein $R_3$ represents methyl or H, and $R_4$ is a hydrogen atom, a $C_1$-$C_8$ linear or branched alkyl, a $C_2$-$C_6$ linear or branched alkoxyalkyl, a furfuryl or a isobornyl group;
   ii. a compound selected from the group consisting of: butanediol di(meth)acrylate, hexanediol di(meth)acrylate, diethylene glycol di(meth)acrylate, triethyleneglycol di(meth)acrylate, polyethylene glycol di(meth)acrylate, trimethylolpropane tri(meth)acrylate, ethoxylated trimethylolpropane tri(meth)acrylate, neopentylglycol diacrylate, pentaerythritol tetraacrylate, pentaerythritol tetramethacrylate, dipentaerythritol penta(meth)acrylate, dipentaerythritol hexa(meth)acrylate, bisphenol-A-diacrylate, bisphenol-A-dimethacrylate, ethoxylated bisphenol-A-diacrylate, propoxylated bisphenol-A-diacrylate, and mixtures thereof; and
   iii. mixtures thereof.

10. The two-part curable composition according to claim 1, wherein the second part of the composition comprises more than 30% by weight of Michael acceptor M based on the total weight of the second part.

11. The two-part curable composition according to claim 1, wherein the Michael acceptor M1 is chosen from the group consisting of: ethoxylated bisphenol-A-di(meth)acrylate, ethoxylated trimethylolpropane tri(meth)acrylate, polyethylene glycol diacrylate, propoxylated neopentyl glycol diacrylate, tetraethylene glycol diacrylate, triethylene glycol diacrylate, tripropylene glycol diacrylate, and mixtures thereof.

12. The two-part curable composition according to claim 1, wherein the Michael acceptors M of the second part of the composition are Michael acceptors M1.

13. The two-part curable composition according to claim 1, wherein the nucleophilic initiator is selected from the group consisting of:
   organic bases;
   salts of hard anions;
   $Ca^{2+}$, $Zn^{2+}$ or $Mg^{2+}$ salts of (meth)acrylic acid; and
   mixtures thereof.

14. The two-part curable composition according to claim 1, wherein the nucleophilic initiator in the second part of the composition is caffeine.

15. The two-part curable composition according to claim 1, wherein the second part of the composition further contains at least one additive chosen from the group consisting of: a thixotropic agent, a thickening agent, a toughening agent, an accelerating agent, a per-compound, an adhesion promoter, a pigment, a colorant, a stabilizing agent, an antioxidant, a plasticizer, and mixtures thereof.

16. The two-part curable composition according to claim 1, wherein the volume ratio first part:second part ranges from 1:1 to 10:1.

17. The two-part curable composition according to claim 1, comprising:
   a first part (component A) comprising:
      at least 70% by weight based on the total weight of the first part, of one or more cyanoacrylate monomer(s), provided that at least one of the cyanoacrylate monomer(s) is a cyanoacrylate monomer comprising a group —X—O—$R^b$ wherein X is a linear or branched alkylene radical optionally interrupted with one or several oxygen atom(s), and $R^b$ is an alkyl group;
      from 0.001% to 0.2% of stabilizing agent(s);
      from 2% to 8% by weight of thixotropic agent(s);
      from 2% to 8% by weight of thickening agent(s); and
   a second part (component B) comprising:
      at least 40% by weight of at least one Michael acceptor M selected from the group consisting of (meth)acrylic monomers, (meth)acrylic functionalized oligomers, (meth)acrylic functionalized resins, and mixtures thereof, provided that at least one of the Michael acceptor(s) M comprises at least one group of formula —O(CHR$^a$—CH$_2$O)$_n$— where n ranges from 1 to 10 (Michael acceptor M1), and $R^a$ represents $CH_3$ or H; and
      from 0.01% to 1% by weight of nucleophilic initiator(s) based on the total weight of the second part;
      from 0% to 5% of thixotropic agent(s);
   the second part being characterized in that the total content of Michael acceptor(s) M1 is of at least 40% by weight based on the total weight of the second part.

18. Syringe or cartridge or dispense heads comprising the two-part curable composition as defined in claim 1.

19. Method for bonding substrates comprising the steps of:
   applying a two-part curable composition as defined in claim 1, to at least one of the substrates,
   mating together the substrates for a time sufficient to permit an adhesive bond to form between the mated substrates; and
   optionally heating the mated (and optionally clamped) substrates, to a temperature higher than 100° C.

* * * * *

UNITED STATES PATENT AND TRADEMARK OFFICE
CERTIFICATE OF CORRECTION

| | | |
|---|---|---|
| PATENT NO. | : 12,157,784 B2 | |
| APPLICATION NO. | : 17/439435 | |
| DATED | : December 3, 2024 | |
| INVENTOR(S) | : Ciaran McArdle et al. | |

It is certified that error appears in the above-identified patent and that said Letters Patent is hereby corrected as shown below:

On the Title Page

Item (72), Inventors: The inventor's name "Maria Campanya Illovet" should be replaced with --Maria CAMPANYÁ I LLOVET--.

Signed and Sealed this
Eighteenth Day of February, 2025

Coke Morgan Stewart
*Acting Director of the United States Patent and Trademark Office*